O. A. Howe,
Horseshoe Machine.
No. 4315. Fig. 1. Reissued Mar. 28. 1871
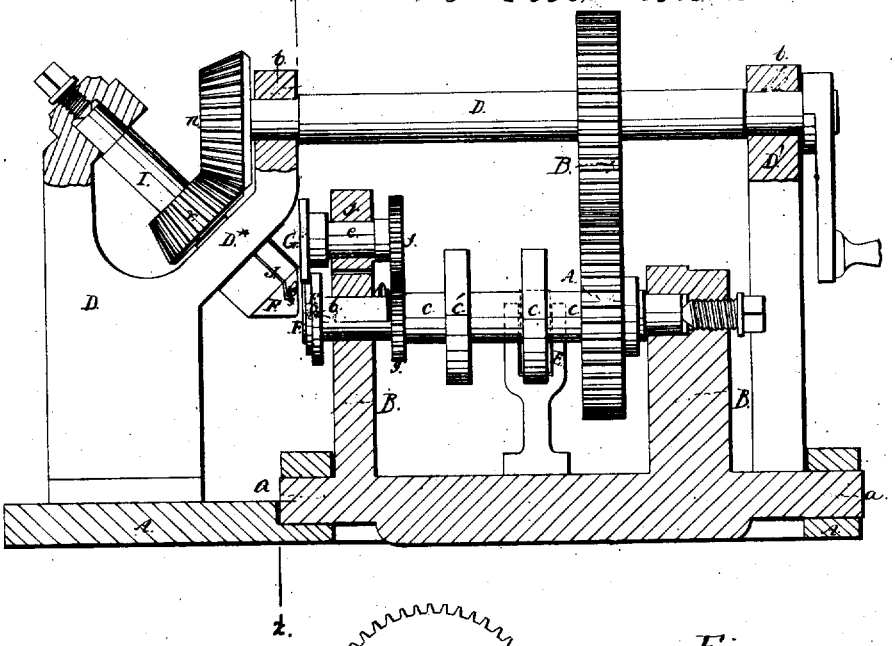
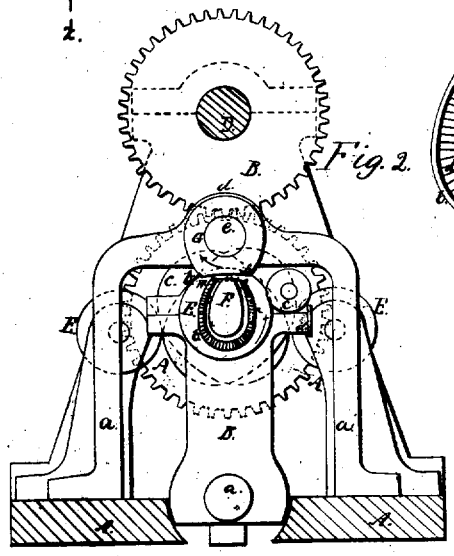
Fig. 2.
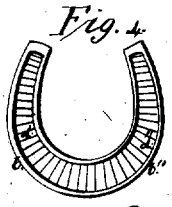
Fig. 4.
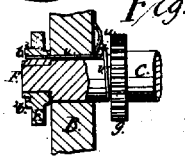
Fig. 3.
Witnesses:
M. Comb.
A. Keeler.
Inventor
Oscar A. Howe.
N. PETERS, PHOTO-LITHOGRAPHER, WASHINGTON, D. C.

UNITED STATES PATENT OFFICE.

OZIAL A. HOWE, OF JERSEY CITY, NEW JERSEY, ASSIGNOR TO THE HOWE HORSESHOE AND MACHINE COMPANY, OF NEW YORK, N. Y.

IMPROVEMENT IN MACHINES FOR MAKING HORSESHOES.

Specification forming part of Letters Patent No. 82,409, dated September 22, 1868; Reissue No. 4,315, dated March 28, 1871.

*To all whom it may concern:*

Be it known that I, OZIAL A. HOWE, of Jersey City, in the county of Hudson and State of New Jersey, have invented a certain new and useful Machine for Bending, Drawing, and Fulling Iron in the form of Horseshoes and other Articles of Manufacture; and I do hereby declare that the following is a full, clear, and exact description of the same, reference being had to the accompanying drawings, making a part of this specification, in which—

Figure 1 is a vertical longitudinal section of a machine constructed according to my invention. Fig. 2 is a vertical transverse section of the same, taken in the line *x x* of Fig. 1. Fig. 3 is a detached sectional view of one portion of the same. Fig. 4 is a detached view, on a larger scale, of one of the horseshoes made by my machine.

Similar letters of reference indicate corresponding parts in all the figures.

The object of this invention is to furnish means of bending, drawing, and "fulling" bars of iron in the form of horseshoe-blanks or other similar curvilineal form in such manner as to have the iron of uniform density on its convex and concave sides or edges—that is, without leaving the fibers of the convex edge or side of the article formed strained and loose in its texture, as is the case when the iron is simply bent without being drawn and fulled at the same time. This object I have accomplished by fabricating a machine substantially such as illustrated by the drawings. This machine is, however, more especially adapted to the formation of horseshoe-blanks; but its operative parts may be readily modified to produce other similar articles of manufacture, as described, without changing the principle involved in its construction and operation.

The essential elements of this machine are three, and may be styled its "operative" or "executive" parts, which must be so formed, combined, and operated in respect to each other as to accomplish the above-described object. These parts are, first, a rotating die; second, a rotating pressure-disk; third, a rotating pressure-cone. The machine also possesses certain means of guiding and feeding the bar of iron from which the blanks are to be made to the aforesaid operative parts of the machine, and also for discharging the blanks after their formation.

To enable others skilled in the art to which my invention appertains to practice the same and to make and use the above-mentioned machine, I will proceed to describe it with reference to the drawings, in which—

A is the bed-plate, which supports the other parts of the machine, and which has pivoted longitudinally thereto a frame, B, the journals of which are shown at *a*. Working longitudinally in the upper part of this frame is a shaft, C, having thereon a spur-wheel, A*, gearing into a similar wheel, B*, upon a shaft, D, arranged above and parallel with the shaft C, and supported in bearings *b*, made in the standards D* D′, bolted or cast on the ends of the base-plate A; also, provided upon the shaft C are two cams, C* C′, extending in opposite directions therefrom, and each working against an anti-friction wheel, E′, supported in brackets *x*, and bolted to the side of the base-plate A in the manner shown, so that a rotary motion being given to the shaft C from the shaft D by any suitable means a lateral and oscillating movement will be given to the frame by the action of the cams against the rollers E′.

Secured upon the inner end of the shaft C is a plate, E, upon the face of which is formed the die F, the circumference of which, with the exception of its nearly or quite flat surface *a*, corresponds in form to the inner periphery of the shoe to be shaped around the same, as hereinafter set forth; also, formed upon the plate, concentric with and at a slight distance from the just-mentioned circumference of the die, is a rib, $b^2$, which extends outward about two-thirds (more or less) of the thickness or circumferential width of the die F, the office of which is to form a continuous recess or depression in the under surface of the shoe, as hereinafter explained.

Attached upon a suitable pivot at one side of the frame B, in the same plane as the die F, is a roller, *c*, which may be slightly grooved at its periphery, and below which is the rectangular notch *b′* of a bracket, *d*, also attached to the frame B in such manner that the stock or iron bar from which the shoe-blank is to be formed, being passed through the notch $b'$ under the roller $c$, will be guided in proper position as it passes toward the die.

Situated above the inner bearing of the shaft C is a bearing, $d'$, supported by suitable standards, $a^*$, and having passed therethrough a short shaft, $e$, to the forward end of which, in the same plane as the die F, is a disk, G, and at the opposite end of which is a spur-pinion, $f$, gearing into a similar pinion, $g$, on the shaft C, so that the disk G is caused to rotate simultaneously with the die F. The disk is so shaped that during such movement its circumference will be at a slight but uniform distance from the outer edge of the rib $b^2$, except that the corner or lip $i$ upon the disk cuts closely past or upon the part or shoulder indicated at $m$ of the die to sever the shoe from the bar, as presently herein set forth.

Working in suitable bearings provided in the standard D* is a shaft, I, which receives motion from the shaft D by means of two bevel-pinions, $n$ $r$, and is placed at an angle of about forty-five degrees. Formed or provided upon the lower end of this shaft is the pressure cone or roller E*, which is nearly or quite in contact with the surface of the die during the simultaneous rotation of the die, the pressure-disk, and the pressure-cone just mentioned.

Attached to the standard D*, contiguous to the presser-cone, is a spring, J, the end of which is bent into a position parallel with the surface of the rib $b^2$, as shown at $g'$, and the purpose of which will presently herein appear.

Shown at $u$ in Fig. 3 is a pusher-rod, which works longitudinally in a groove formed in one side of the shaft C, and through a hole formed through the plate E and die F, and which is pressed outward by a spring, $v$, coiled around the shaft C. The inner end of this pusher-rod is curved outward to form a spur, $u$, so that at one portion of the revolution of the shaft the spur will strike an inclined plane, $u^*$, attached to the frame B in such manner that the pusher-rod will be drawn back, the office of the pusher-rod being to throw the shaped or finished shoe-blank from the mold, as hereinafter fully set forth.

In using the machine the bar of iron from which the blank shoes are to be made, being first heated to the requisite degree, is thrust endwise through the notch $b'$ of the bracket $d$, under the wheel $c$, and is guided thereby in such manner that its extremity will be pressed against the face of the rib $b^2$ by the spring $g'$, and be caught by the corner $f'$ of the presser-disk G and the part or shoulder $g^*$ of the die, and be drawn in between the die and disk, the bar passing in front of the rib $b^2$ in such manner that the cone F* may press the same inward upon the rib, with its edges forced back to the plate E, simultaneously with which the rotation of the die and disk, by bending the metal around the die and shaping the same by the pressure of the disk thereon, gives the requisite curvature to the shoe-blank and the somewhat tapering form required in the two lateral portions thereof, while the rib $b^2$, being indented into the surface of the shoe, forms the channel or recess indicated at $a''$ in Fig. 4, the inner and outer edges of the under side of the shoe being by this means furnished with rims or flanges $b''$. When the shoe-blank is thus shaped, the lip or corner $i$ of the disk, cutting past or upon the shoulder $m$ of the die, severs the shoe from the bar. As soon as the shoe is thus severed from the bar, the spring $v$ forces the pusher-rod $u$ outward against the shoe, and throws the same from the die, after which, the spur $u'$ of the pusher-rod striking the inclined plane $u^*$, the pusher-rod is again drawn inward, whereupon the bar is again pushed or fed inward, and the succeeding blank is formed in like manner. Now, it will be seen that in this operation the iron is drawn and bent around the die F by the presser-disk G, the iron being seized between the two, while at the same time it is fulled from the inside toward the outside by the cone or roller F*, forcing the iron to the outside rim of the shoe, closing the fibers of the iron, and increasing the hardness where the greatest density is needed.

Having now described the nature and extent of my invention, I claim as new herein, and desire to secure by Letters Patent—

1. The construction of the rotary die, the rotary pressure-disk, and rotary cone, severally jointly with the combination of them in the manner described.

2. The combination of the rotating pressure-disk G, the rotating die F, and the oscillating frame B, substantially as and for the purpose specified.

3. The arrangement of the rotating pressure-cone F* upon the oblique shaft I, when combined with the pressure-disk G, and the rotating die F, carried upon the oscillating frame B, substantially as and for the purpose specified.

4. The arrangement of the guide-notch $b'$ and the wheel $c$ upon the frame B, and in relation with the rotating die F, carried thereby, and the pressure-disk G, substantially as and for the purpose specified.

5. The arrangement of the spring J with reference to the rotating die F, presser-disk G, and presser-cone F*, substantially as and for the purpose specified.

OZIAL A. HOWE.

Witnesses:

AMOS BROADNAX,
CLARENCE DELAFIELD.